United States Patent [19]

Haring

[11] 4,310,073
[45] Jan. 12, 1982

[54] DRIVERLESS VEHICLE SPEED RETARDER
[75] Inventor: Richard Haring, Bethlehem, Pa.
[73] Assignee: SI Handling Systems, Inc., Easton, Pa.
[21] Appl. No.: 122,343
[22] Filed: Feb. 19, 1980
[51] Int. Cl.³ .............................................. B61K 7/02
[52] U.S. Cl. ..................................... 188/62; 104/250; 238/10 F; 193/40
[58] Field of Search ................. 104/172 BT, 249, 250, 104/251, 253, 254, 255; 188/62, 38.5; 193/40

[56] References Cited
U.S. PATENT DOCUMENTS

| | | | |
|---|---|---|---|
| 2,505,963 | 5/1950 | Hedenskoog | 193/40 |
| 3,039,402 | 6/1962 | Richardson | 188/62 |
| 3,040,676 | 6/1972 | Checkley et al. | 188/62 |
| 3,332,519 | 7/1967 | Danieli | 188/62 |

Primary Examiner—Richard A. Bertsch
Attorney, Agent, or Firm—Seidel, Gonda, Goldhammer & Panitch

[57] ABSTRACT

The speed of loaded and unloaded driverless vehicles traveling along an inclined path is controlled by a hydraulic retarder mechanism which dissipates the kinetic energy of the vehicle. The retarder mechanism is velocity sensitive and projects into the path of part of the vehicle. The retarder mechanism slows down fast moving vehicles but has little or no effect on slow moving vehicles.

5 Claims, 5 Drawing Figures

DRIVERLESS VEHICLE SPEED RETARDER

BACKGROUND OF THE INVENTION

In various industries driverless vehicles are loaded with heavy loads and move along a guide path that has one or more inclined portions. For example, in the printing industry rolls of paper weighing several tons are conveyed by vehicles from a storage area to a printing area. If a portion of the floor is inclined, the vehicle carrying a heavy load will be propelled by gravity so as to generate sufficient kinetic energy whereby damage will be caused when the vehicle collides with some other object.

The problem solved is how to retard fast moving driverless vehicles moving under the effect of gravity with a heavy load on an inclined floor while not significantly effecting the velocity of slow moving empty vehicles.

SUMMARY OF THE INVENTION

The present invention is directed to a retarder for use in retarding fast moving driverless vehicles while having little or no effect on slow moving driverless vehicles. The present invention includes a housing adapted to be mounted along a sloping guide path. The housing has a cover which is adapted to be flush with the floor so that wheels of the vehicle can ride over the cover. The housing has an opening into which a portion of a vehicle can extend as the vehicle moves along the guide path.

The present invention includes a velocity responsive retarder mechanism mounted in said housing. The mechanism includes a cantilever arm pivotable about a vertical axis with the free end of the arm being adjacent said opening for pivotable movement due to contact with a portion of the vehicle. The mechanism includes a conventional shock absorber coupled to said arm for retarding rapid pivotable movement of said arm while permitting slow pivotable movement of said arm. A biasing means is connected to the arm for biasing the arm to the upstream end of its range of pivotable movement.

It is an object of the present invention to provide a novel speed retarder for driverless vehicles moving along an inclined path due to gravity.

It is another object of the present invention to provide a retarder for retarding fast moving driverless vehicles so that the velocity of the vehicles can be reduced from about 100 feet per minute to about 5 feet per minute as the vehicle travels over a distance of about 10 inches.

It is another object of the present invention to provide a retarder system for retarding fast moving driverless vehicles in a manner which is simple, inexpensive, and reliable.

Other objects will appear hereinafter.

For the purposes of illustrating the invention, there is shown in the drawings a form which is presently preferred; it being understood, however, that this invention is not limited to the precise arrangements and instrumentalities shown.

DETAILED DESCRIPTION

Figure 1:
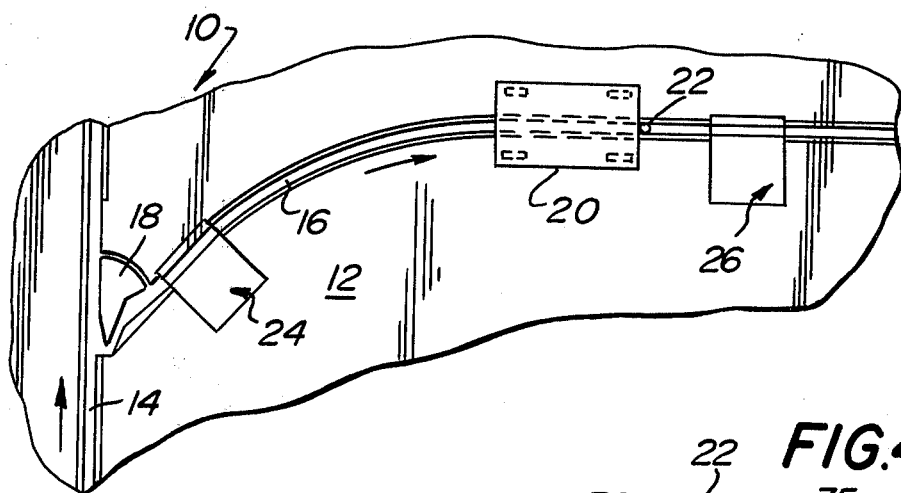
FIG. 1 is a partial plan view of a floor mounted driverless vehicle conveyor system.
Figure 4:
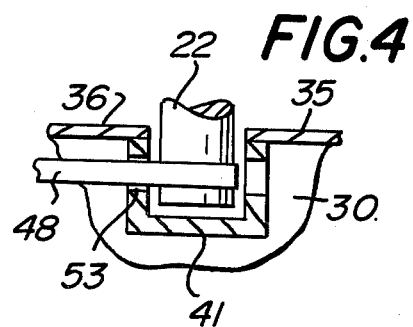
FIG. 4 is a sectional view taken along the line 4—4 in FIG. 2.
Figure 5:
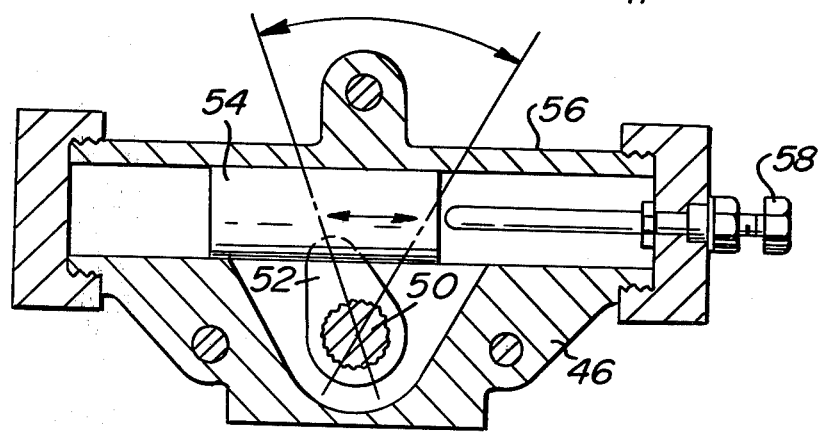
FIG. 5 is a sectional view taken along the line 5—5 in FIG. 3.

Referring to the drawing in detail, wherein like numerals indicate like elements, there is shown in FIG. 1 a system designated generally as 10 and is supported by a floor 12. The system 10 includes a main slot 14 which constitutes a guide path for driverless vehicles and which includes a sub-floor conveyor system for propelling the vehicles. The vehicles designated generally as 20 may be transferred from movement along the main slot 14 to movement along a slot 16 which intersects the same. A pivotably mounted control member 18 is selectively operable to divert vehicles 20 from movement along slot 14 to movement along slot 16.

The floor at slot 16 slopes from left to right in FIG. 1 with the inclined being about 5 degrees for purposes of illustration. There is no conveyor associated with slot 16. Hence, the vehicles 20 under the effect of gravity can rapidly increase speed as they move along slot 16 and can cause great damage when they contact an obstruction unless the velocity of the vehicles 20 is controlled. At spaced points along the slot 16, there is provided retarder assemblies 24, 26, etc. The spacing between the retarder assemblies may be varied depending upon the number, weight, and length of vehicles traversing the area per unit time. Thus, the distance between adjacent retarder assemblies will generally vary from 10 to 15 feet.

The retarder assemblies 24, 26, etc. are identical. Hence, only assembly 26 will be described in detail. The assembly 26 is designated with an opening through which a portion of the vehicle 20 will traverse. As illustrated, the vehicle 20 has a conventional tow pin 22 adapted to be contacted by a pushing surface on a sub-floor conveyor. In connection with the present invention, the tow pin 22 merely guides the vehicle 20 as the vehicle 20 moves along the guide path defined by the slot 16.

Figure 2:
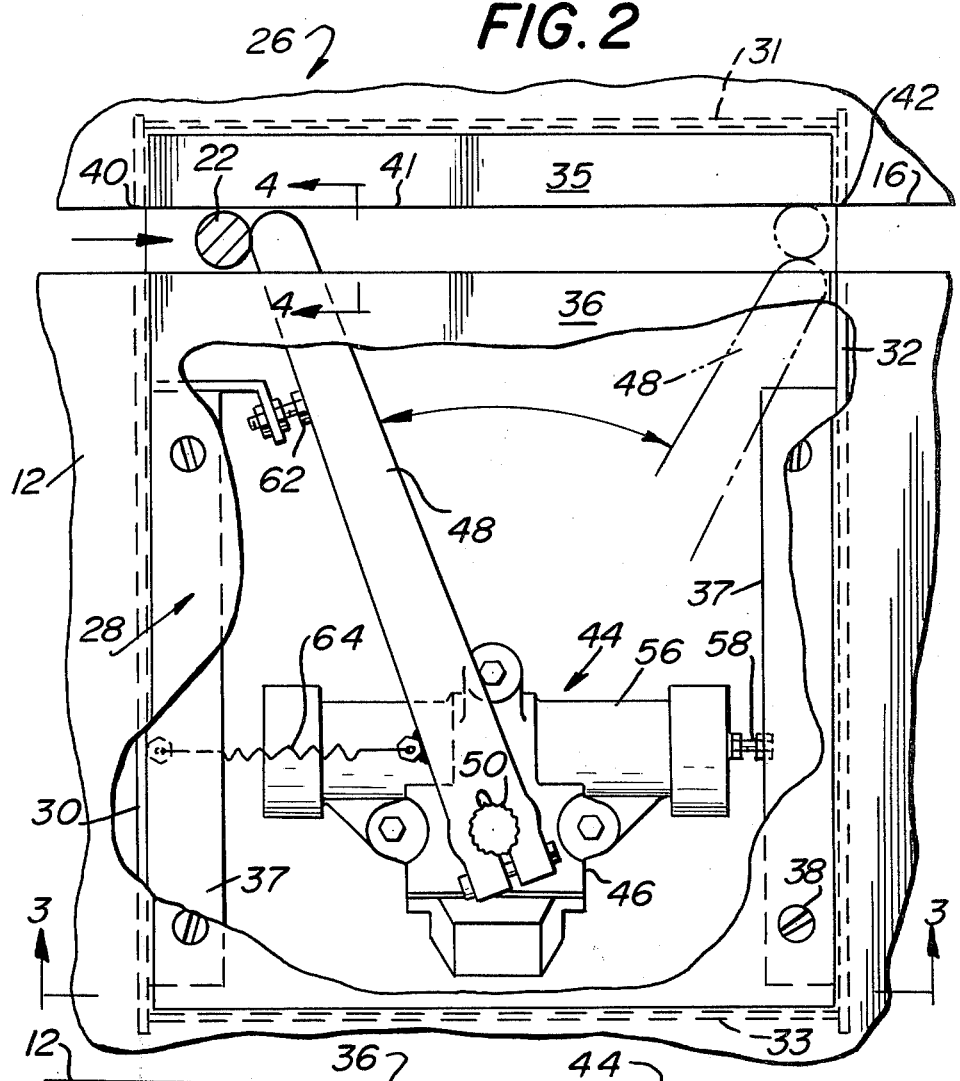
FIG. 2 is an enlarged plan view of the retarder shown in FIG. 1 but with portions broken away for purposes of illustration.
Figure 3:
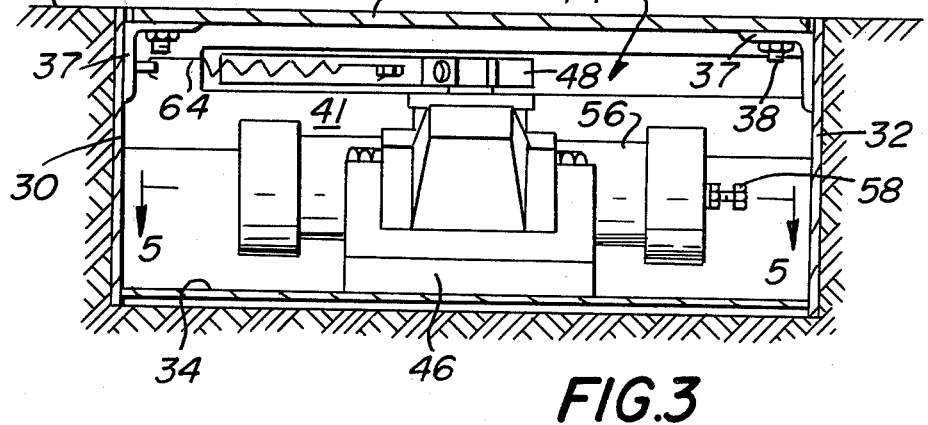
FIG. 3 is a sectional view taken along the line 3—3 in FIG. 2

Referring to FIGS. 2 and 3, the retarder assembly 26 includes a housing 28 having a bottom wall 34 and upstanding side walls 30 and 32 as well as end walls 31 and 33. The top wall is defined by panel 35 integral with end wall 31 and a panel 35 is spaced from cover 36. The bottom wall 34 is of substantial thickness such as 3/16 inch thick carbon steel and is supported by concrete disposed therebelow. The cover 36 is preferably made of thicker metal such as 5/16 inch thick steel.

The side wall 30 is provided with a U-shaped notch 40 beginning at the upper end thereof and aligned with the gap between the panel 35 and cover 36. The side wall 32 is provided with a similar notch 42. Within the housing 28 there is provided a U-shaped or L-shaped trough open at its upper end and welded at its ends to the side walls 30, 32. The trough designated 41 is U-shaped and forms a continuation of the guide path defined by similar track portions of the slot 16. Hence, as the vehicle 20 rolls over the cover 36 the tow pin 22 will traverse the trough 41. During such movement, the velocity of the vehicle 20 will be controlled if its speed is above a safe limit such as 5 to 7 fpm.

The retarder mechanism 44 includes a body 46 which is bolted or otherwise fixedly secured to the bottom wall 34 of the housing 28. A cantilever arm 48 has one end extending through a slot 53 in the trough 41 and has its other end adjustably secured in a vertically disposed shaft 50. Shaft 50 is rotatably supported by the body 46 and has a cam 52 cooperating with the piston 54 within the cylinder 56. As shaft 50 rotates, cam 52 reciprocates the piston 54. The cylinder 56 and the upper portion of the body are filled with a hydraulic fluid such as oil. The piston 54 contains a check valve not shown which permits the hydraulic fluid to bleed from one side of the piston to the other as the piston reciprocates. A metering screw 58 is provided for controlling flow through the piston 54. Metering screw 58 is adjustably supported by an end cap on the downstream end of cylinder 56.

A limit stop 62 is provided for adjusting the initial or start portion of the arm 48. See FIG. 2. Limit stop 62 is supported by one of the brackets 37. A spring 64 has one end connected to the arm 48 and its other end connected to the bracket 37 to thereby bias the arm 48 against the limit stop 62. The range of pivotable movement of the arm 48 is approximately 50 degrees and the linear length of such movement along the trough 41 is about 10 inches. These dimensions may be varied as desired to fit any particular system and set of circumstances.

If a vehicle 20 has no load it will move along the slot 16 under the effect of gravity with less kinetic energy than a heavily loaded vehicle. If the unloaded vehicle is moving along slot 16 at a safe speed such as five feet per minute or less, the retarder assembly 26 will have little or no effect on such vehicle. Thus, the tow pin 22 will cause the arm 48 to rotate about the vertical axis of shaft 50 at a uniform slow velocity whereby flow of oil or other hydraulic fluid from one side of the piston 54 to the other will have no effect on the movement of the vehicle.

The kinetic energy of a vehicle is a function of its weight and the square of its velocity. A heavily loaded vehicle 20 will have greater kinetic energy as it moves along an inclined path due to gravity as compared with an unloaded vehicle. If the loaded vehicle is traveling at a high rate of speed such as 100 feet per minute, the retarder mechanism 44 will reduce the speed of the vehicle down to about 5 feet per minute over the short distance that the tow pin 22 is in contact with the arm 48. Such distance may be only 10 inches with arm 48 pivoting through an arc of about 50 degrees. When the tow pin 22 traveling at a high speed contacts the arm 48, the oil or other hydraulic fluid cannot move from one end of the piston 54 to the other fast enough whereby the piston 54 tries to compress the oil or hydraulic fluid and offers resistance to the movement of the tow pin 22 which in turn slows down the vehicle 20. As soon as the tow pin 22 looses contact with the free end of arm 48, the spring 64 rapidly returns the arm 48 to its starting position against the limit stop 62 as shown in FIG. 2.

Since there is no metering pin associated with the upstream end of cylinder 56, the spring 64 does not encounter any substantial hydraulic resistance in returning the arm 48 to a position against limit stop 62.

The specific details of controlling flow from one end of the piston 54 to the other per se forms no part of the present invention since the same is conventional. For example, I prefer to use a commercially available shock absorber sold by Modern Industries, Inc.

The retarder assembly of the present invention may be used with other types of driverless vehicles wherein the guide path is a pair of tracks or other structure so long as the vehicles are provided with an upright member which can contact arm 48.

The present invention may be embodied in other specific forms without departing from the spirit or essential attributes thereof and, accordingly, reference should be made to the appended claims, rather than to the foregoing specification, as indicating the scope of the invention.

I claim:

1. A driverless vehicle speed retarder for use in retarding fast moving driverless vehicles under the effect of gravity while having little or no effect on slow moving driverless vehicles comprising a housing adapted to be mounted along a sloping guide path, said housing having a cover adapted to be flush with a floor, said housing having an opening through which a portion of a vehicle can extend as the vehicle moves along the guide path, a velocity responsive retarder mechanism mounted in said housing, said mechanism including a cantilever arm pivotable about a vertical axis with the free end of said arm being adjacent said opening for pivotable movement due to contact with a portion of a vehicle, said mechanism including a shock absorber coupled to said arm for retarding rapid pivotable movement of said arm while permitting slow pivotable movement of said arm, and means in said housing biasing said arm to a limit stop adjacent the upstream end of its range of pivotable movement.

2. A retarder in accordance with claim 1 wherein said opening is defined by a trough extending across said housing and being open at its upper end, said housing having a notch adjacent each end of said trough and aligned therewith.

3. A retarder in accordance with claim 2 wherein said trough has an opening through which the free end portion of said arm extends.

4. A retarder in accordance with claim 1 wherein rapid pivotable movement is above a speed of about 5–8 feet per minute and slow pivotable movement is below about 5 feet per minute.

5. A retarder in accordance with claim 1 wherein said opening extends across the top wall of said housing.

* * * * *